US010845564B2

(12) United States Patent
Aoki

(10) Patent No.: US 10,845,564 B2
(45) Date of Patent: Nov. 24, 2020

(54) LENS APPARATUS AND IMAGE PICKUP APPARATUS

(71) Applicant: CANON KABUSHIKI KAISHA, Tokyo (JP)

(72) Inventor: Katsuhisa Aoki, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 104 days.

(21) Appl. No.: 16/113,868

(22) Filed: Aug. 27, 2018

(65) Prior Publication Data
US 2019/0064474 A1 Feb. 28, 2019

(30) Foreign Application Priority Data
Aug. 31, 2017 (JP) .................. 2017-167277

(51) Int. Cl.
*G02B 15/14* (2006.01)
*G02B 7/04* (2006.01)
*G02B 15/20* (2006.01)
*G02B 7/02* (2006.01)
*G02B 7/08* (2006.01)

(52) U.S. Cl.
CPC .............. *G02B 7/04* (2013.01); *G02B 7/021* (2013.01); *G02B 7/023* (2013.01); *G02B 7/08* (2013.01); *G02B 15/20* (2013.01)

(58) Field of Classification Search
CPC . G02B 7/10; G02B 7/023; G02B 7/04; G02B 15/14; G02B 15/16; G02B 15/20; G02B 27/64; G03B 13/36; G03B 13/10; G03B 27/36
USPC .................. 359/676–706, 819–830
See application file for complete search history.

(56) References Cited

U.S. PATENT DOCUMENTS

2019/0011659 A1* 1/2019 Koyama ............... G02B 15/16

FOREIGN PATENT DOCUMENTS

JP 7-287156 A 10/1995

* cited by examiner

*Primary Examiner* — Mahidere S Sahle
(74) *Attorney, Agent, or Firm* — Canon U.S.A., Inc. IP Division

(57) ABSTRACT

A lens apparatus includes a lens unit including a first lens, a fixing frame which holds the lens unit with the lens unit being movable in a direction of an optical axis of the lens unit, and a first power transmission device configured to transmit power to the lens unit. The lens unit includes a balancer and a second power transmission device. The balancer and the second power transmission device are configured such that a force applied to the balancer causes the second power transmission device to reduce a load applied to the first power transmission device in a case where the lens unit is moved in a direction against a gravitational force applied thereto.

10 Claims, 15 Drawing Sheets

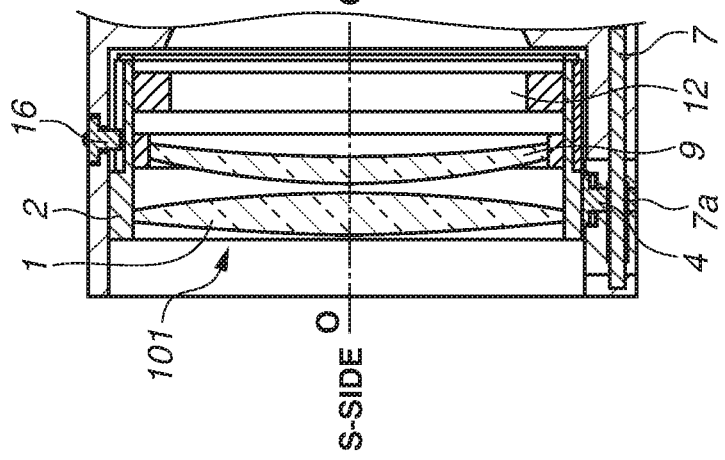
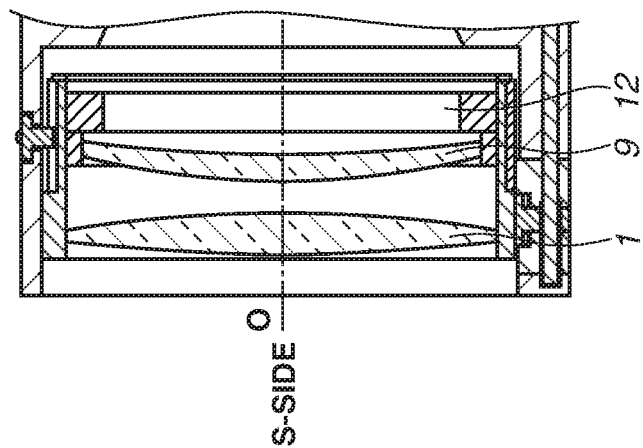
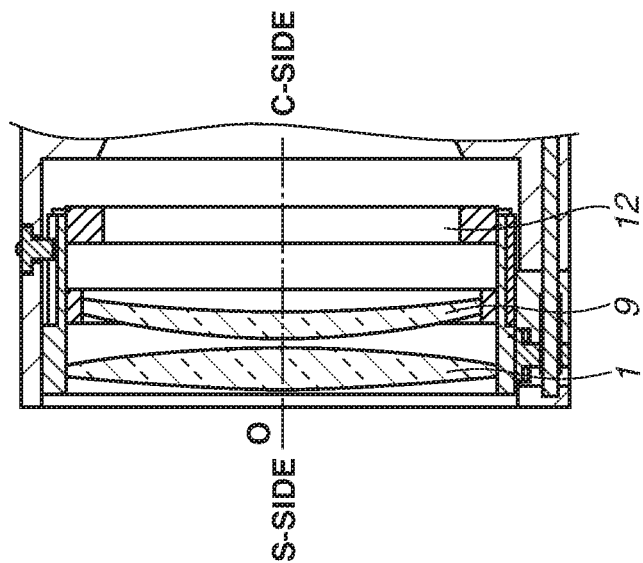

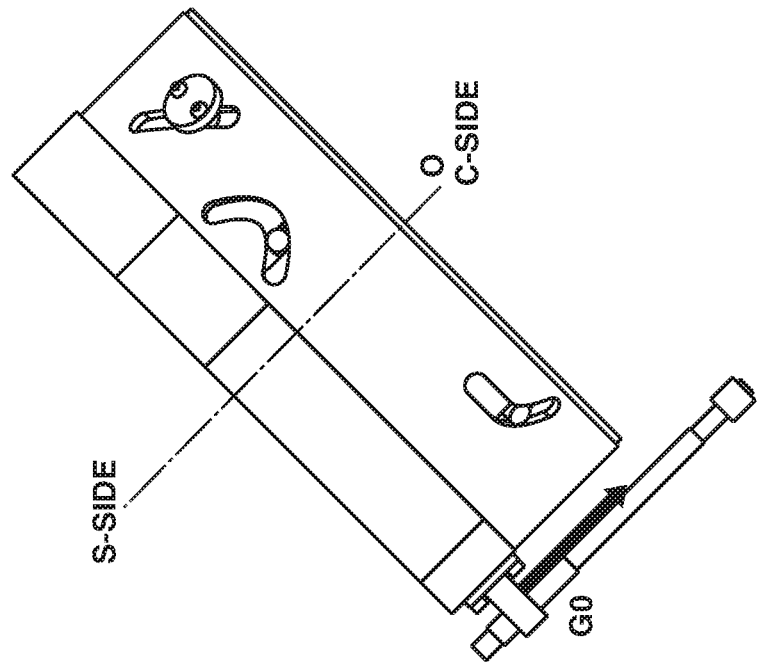
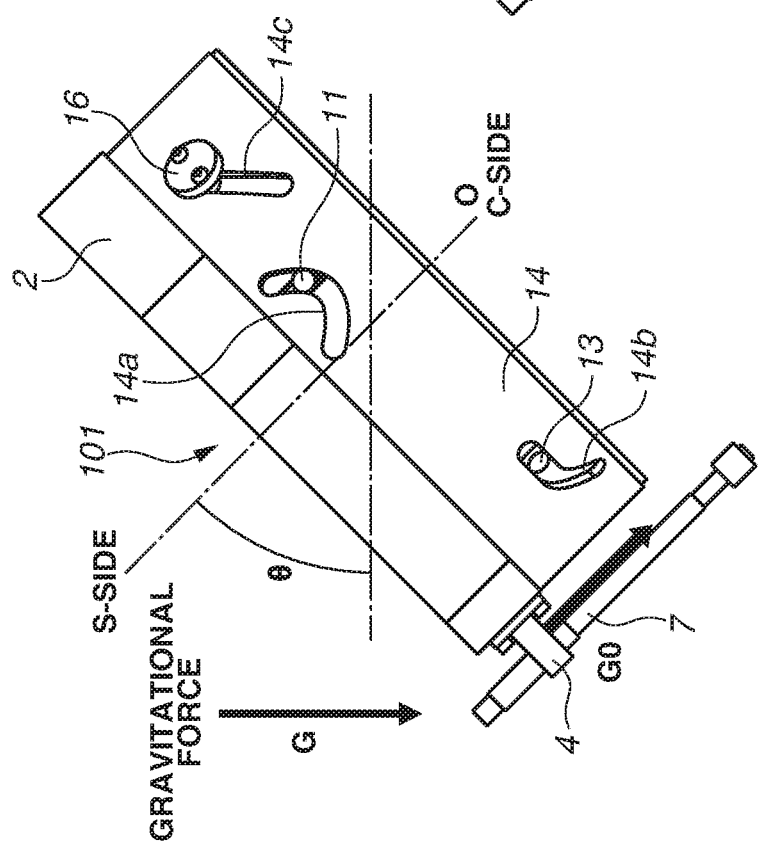

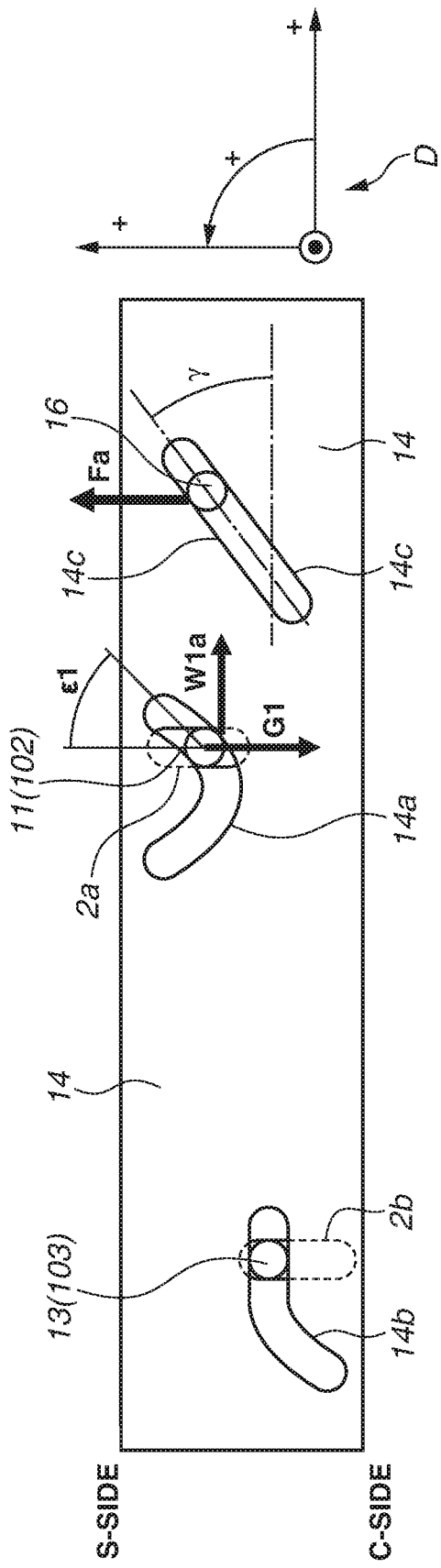
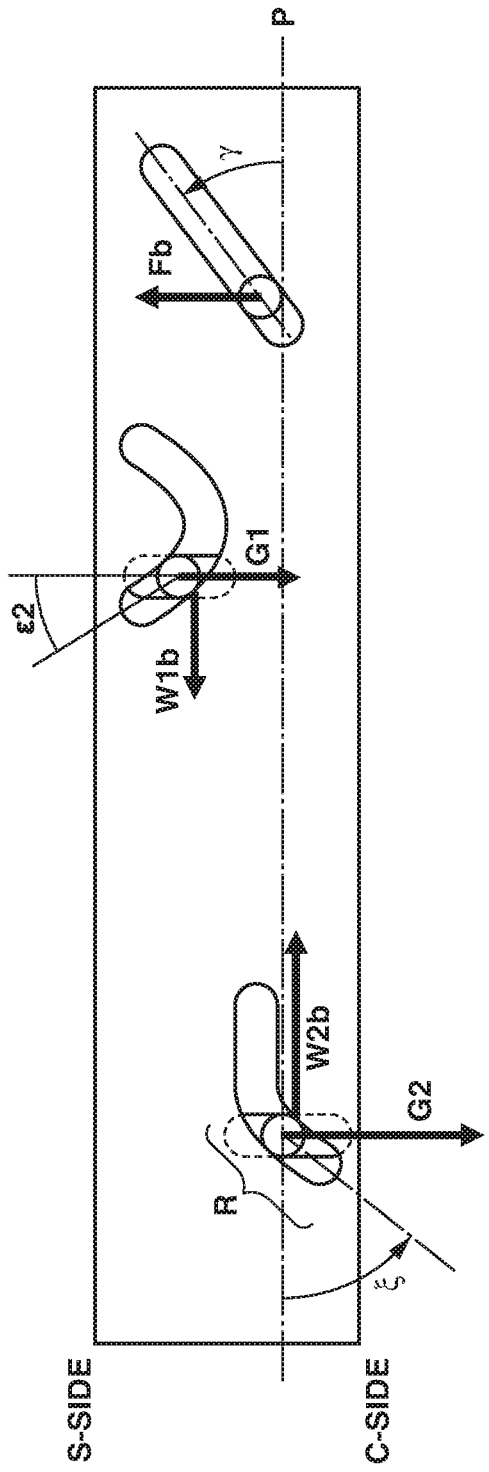

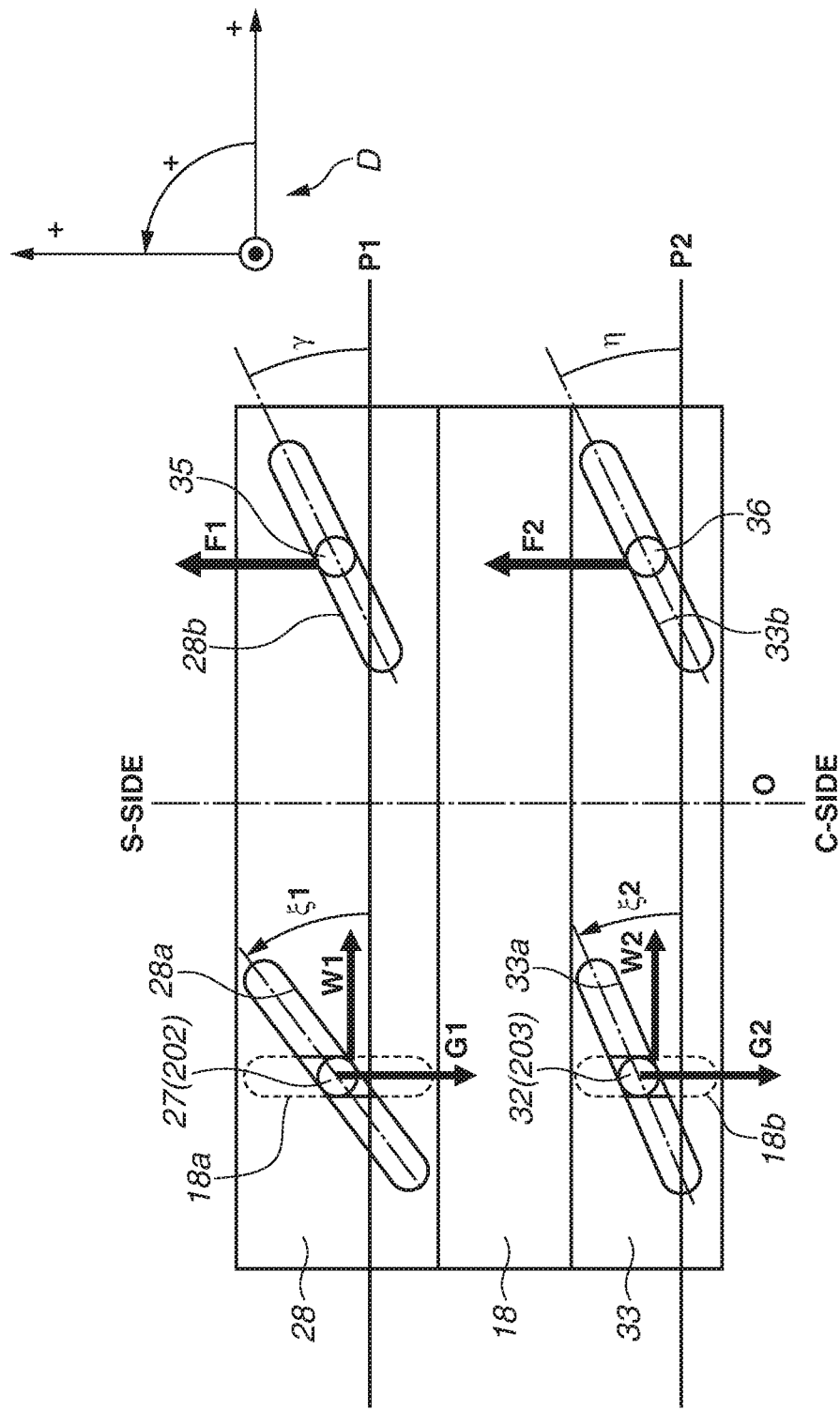

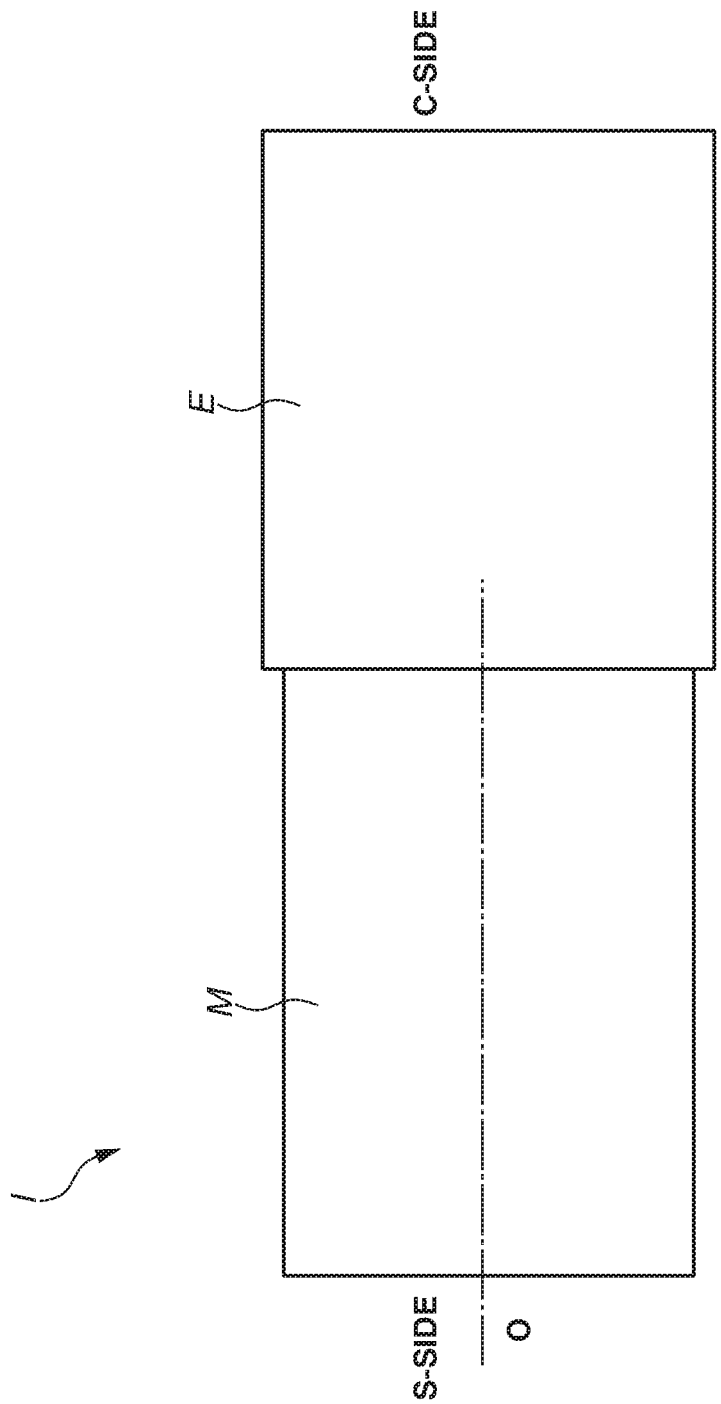

LENS APPARATUS AND IMAGE PICKUP APPARATUS

BACKGROUND OF THE INVENTION

Field of the Invention

The present disclosure relates to a lens apparatus and an image pickup apparatus.

Description of the Related Art

Conventionally, in order to suppress aberration fluctuation associated with focusing operation, there has been known a lens apparatus in which a distance between lenses constituting a focus lens group is changed at the same time as the entire focus lens group is moved. Japanese Patent Application Laid-Open No. 7-287156 discusses a lens apparatus including a thus lens unit in which a distance between a main lens group and a sub-lens group is changed through a cam that drives the sub-lens group.

If the lens apparatus including the above-described focus lens unit is used in a non-horizontal attitude, the focus lens unit may be driven in a direction against the gravitational force. In this case, a load caused by weight of the focus lens unit is applied to a helicoid screw, and thereby a driving load is increased.

Further, according to the technique described in Japanese Patent Application Laid-Open No. 7-287156, at the same time as the focus lens unit is driven in a direction against the gravitational force, a sub-lens included in the focus lens unit is driven in a direction against the gravitational force. In this case, in addition to the load caused by the weight of the focus lens unit, a load caused by weight of the sub-lens is applied to the helicoid screw through a cam, and thereby a driving load is increased considerably.

SUMMARY OF THE INVENTION

The disclosure is directed to, for example, a lens apparatus advantageous in reduction of a load for moving a lens unit therein.

According to an aspect of the disclosure, a lens apparatus includes a lens unit including a first lens, a fixing frame which holds the lens unit with the lens unit being movable in a direction of an optical axis of the lens unit, and a first power transmission device configured to transmit power to the lens unit. The lens unit includes a balancer and a second power transmission device. The balancer and the second power transmission device are configured such that a force applied to the balancer causes the second power transmission device to reduce a load applied to the first power transmission device in a case where the lens unit is moved in a direction against a gravitational force applied thereto.

Further features of the present disclosure will become apparent from the following description of exemplary embodiments with reference to the attached drawings.

BRIEF DESCRIPTION OF THE DRAWINGS

FIGS. 4A, 4B, and 4C are diagrams each illustrating a cross-sectional view of the lens unit taken along a line A-A in FIG. 1.

FIGS. 6A and 6B are diagrams illustrating side views of the lens unit when the lens apparatus according to the first exemplary embodiment is held non-horizontally.

FIGS. 7A and 7B are diagrams illustrating a development view of a cam barrel when the lens apparatus according to the first exemplary embodiment is held non-horizontally.

FIG. 14 is a diagram illustrating a development view of the can barrel when the lens apparatus according to the second exemplary embodiment is held non-horizontally.

FIG. 15 is a conceptual diagram of an imaging apparatus including a lens apparatus according to the present disclosure.

DESCRIPTION OF THE EMBODIMENTS

Hereinafter, preferred exemplary embodiments of the present disclosure will be described in detail with reference to the appended drawings. FIGS. 1 to 14 are diagrams illustrating a lens apparatus according to the exemplary embodiments of the present disclosure.

Hereinafter, a lens apparatus according to a first exemplary embodiment of the present disclosure will be described with reference to FIGS. 1 to 7B.

In the present exemplary embodiment, a lens apparatus refers to a zoom lens. Hereinafter, a focus lens unit including a focus lens group will be taken as an example of the lens apparatus, and a configuration for moving the lens group in an optical direction will be described. Note that the present disclosure is also applicable to driving operation of a lens group other than the focus lens group. For example, the present disclosure is also applicable to a variator lens group, a compensator lens group, a relay lens group, and the like if the lens group is driven in an optical direction.

The focus lens group according to the present exemplary embodiment is divided into two types of lenses of a main lens and a sub-lens, and the sub-lens is arranged on a side of an image sensor of the main lens. In the present exemplary embodiment, an example is provided in which each of the main lens and the sub-lens is constituted of a single lens; however, each of the main lens and the sub-lens may also be constituted of a plurality of lenses.

<Configuration of Lens Unit>

Figure 1:
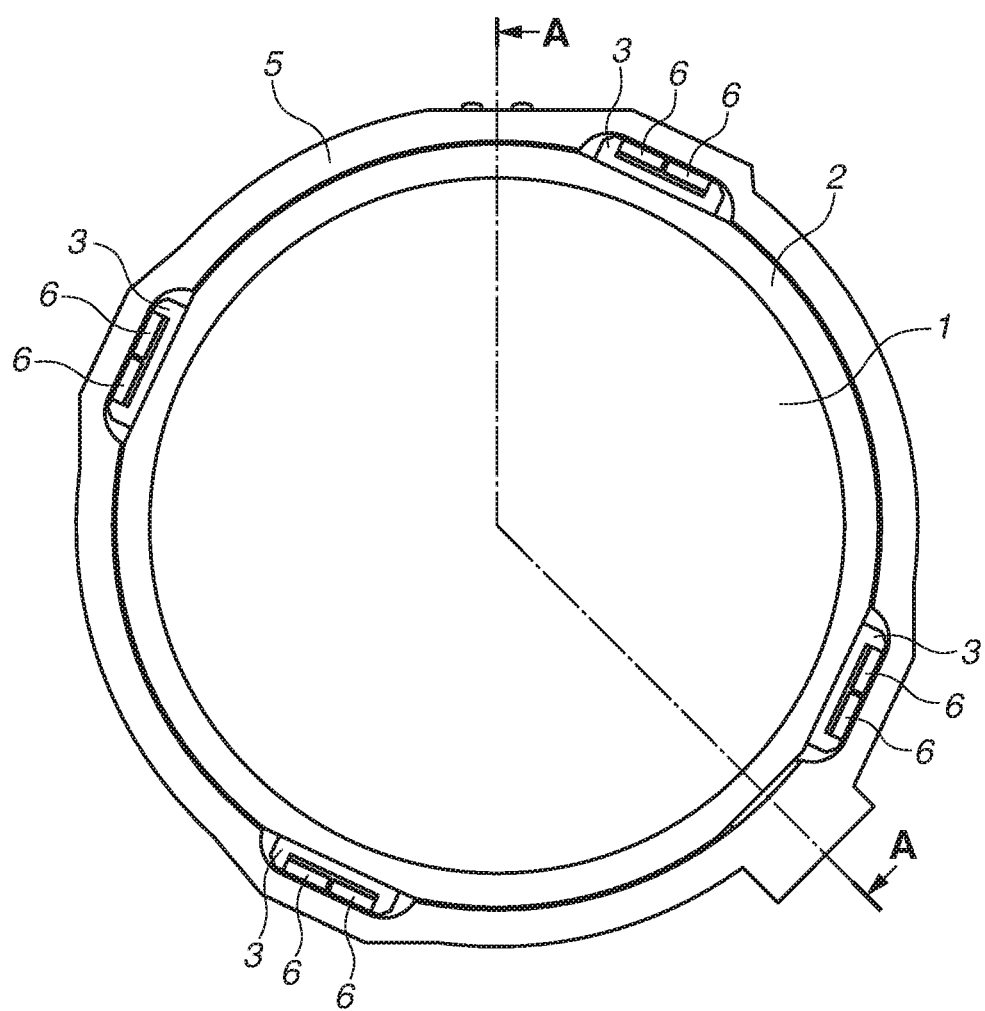
FIG. 1 is a diagram illustrating a front view of a lens unit according to a first exemplary embodiment.
Figure 2:
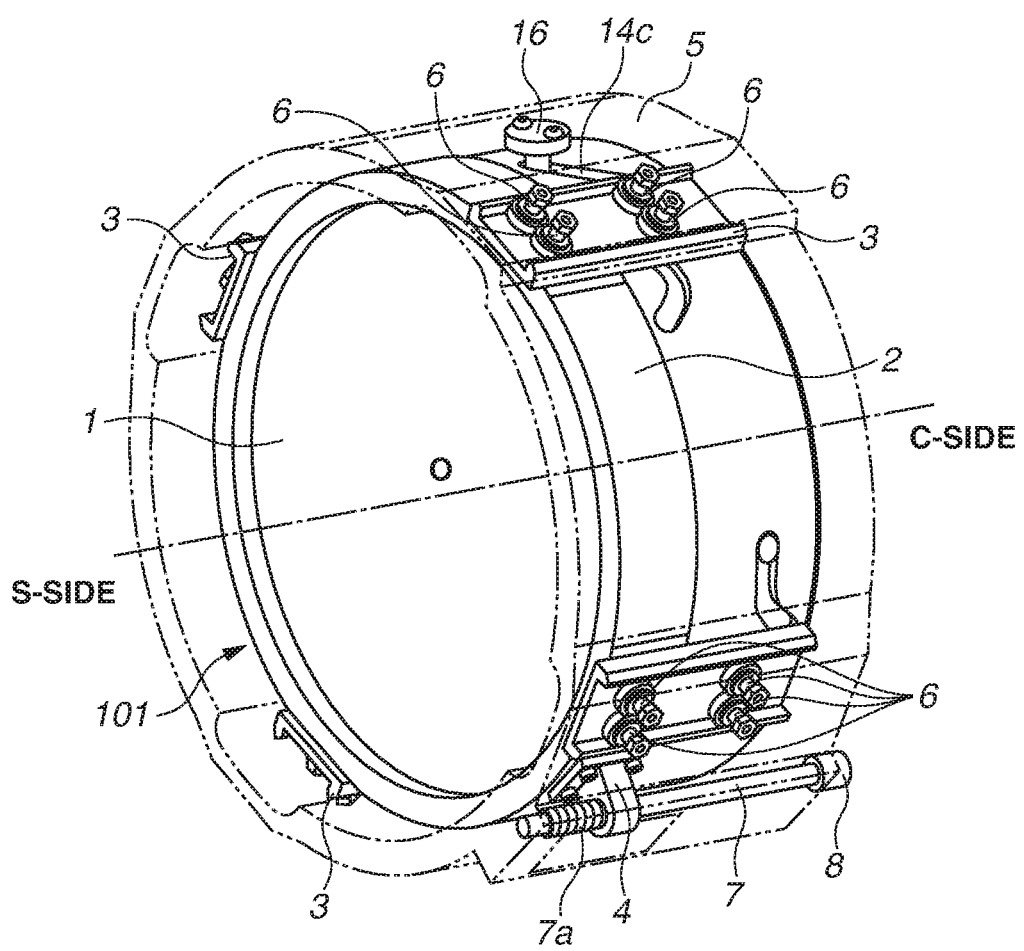
FIG. 2 is a diagram illustrating a perspective view of main portions of the lens unit according to the first exemplary embodiment.

A configuration of a lens unit 101 as a focus lens unit including a focus lens group will be described with reference to FIGS. 1 and 2. FIG. 1 is a diagram illustrating a front view of the lens unit 101 viewed from a side of a subject. FIG. 2 is a perspective diagram illustrating main portions of the lens unit 101.

A main lens (first lens) 1 is held by a lens barrel 2 as illustrated in FIG. 1. In FIG. 2, a side on which the main lens 1 is visible is a subject side of the lens apparatus (hereinafter referred to as S-side). A lens unit (not illustrated) including another lens group, a mount portion (not illustrated) for connecting to a camera that includes an image sensor, and the like are provided on an opposite side of the S-side in an optical axis O direction (hereinafter referred to as C-side).

As illustrated in FIG. 2, the lens barrel 2 includes a female helicoid screw member 4 and four guide groove members 3.

A frame (fixing frame) 5 includes guide rollers 6. As illustrated in FIG. 1, four sets of guide rollers 6, each set including four guide rollers 6 that engage with one guide groove member 3, are fixed on an inner diameter side of the frame 5. The sets of guide rollers 6 are fixed thereon at four positions, respectively, at equiangular intervals in a circumferential direction.

The frame 5 rotatably holds a male helicoid screw member (first power transmission portion or device) 7 at a fixed position (i.e., a position restricted in the optical axis direction). A screw portion 7a of the male helicoid screw member 7 is screwed with a screw portion (not illustrated) inside the female helicoid screw member 4. The entire lens unit 101 including the female helicoid screw member 4 is movably held by the frame 5, and if the male helicoid screw member 7 is rotated, the lens unit 101 is moved in the optical axis O direction relative to the frame 5 interlocked with rotation of the male helicoid screw member 7.

A gear 8 is provided on a leading end of the male helicoid screw member 7, and the male helicoid screw member 7 rotates by receiving driving force of a motor (not illustrated) via the gear 8.

In the present exemplary embodiment, a power source such as a motor can be attached to and detached from the lens apparatus. If the power source such as the motor is connected to the lens apparatus via the gear 8, electric-powered focus driving operation can be performed. If the motor is detached and an operation unit or operation device (not illustrated) is connected via the gear 8 instead of the motor, manual focus driving operation can be performed as well. In this case, the power source is a user who operates the operation unit.

The motor serving as the power source or the operation unit can be attached to the lens unit 101, another lens unit connected to the C-side of the lens unit 101, or a camera (not illustrated) to which the lens apparatus is connected.

<Configuration of Sub-lens and Balancer Portion>

Figure 3:
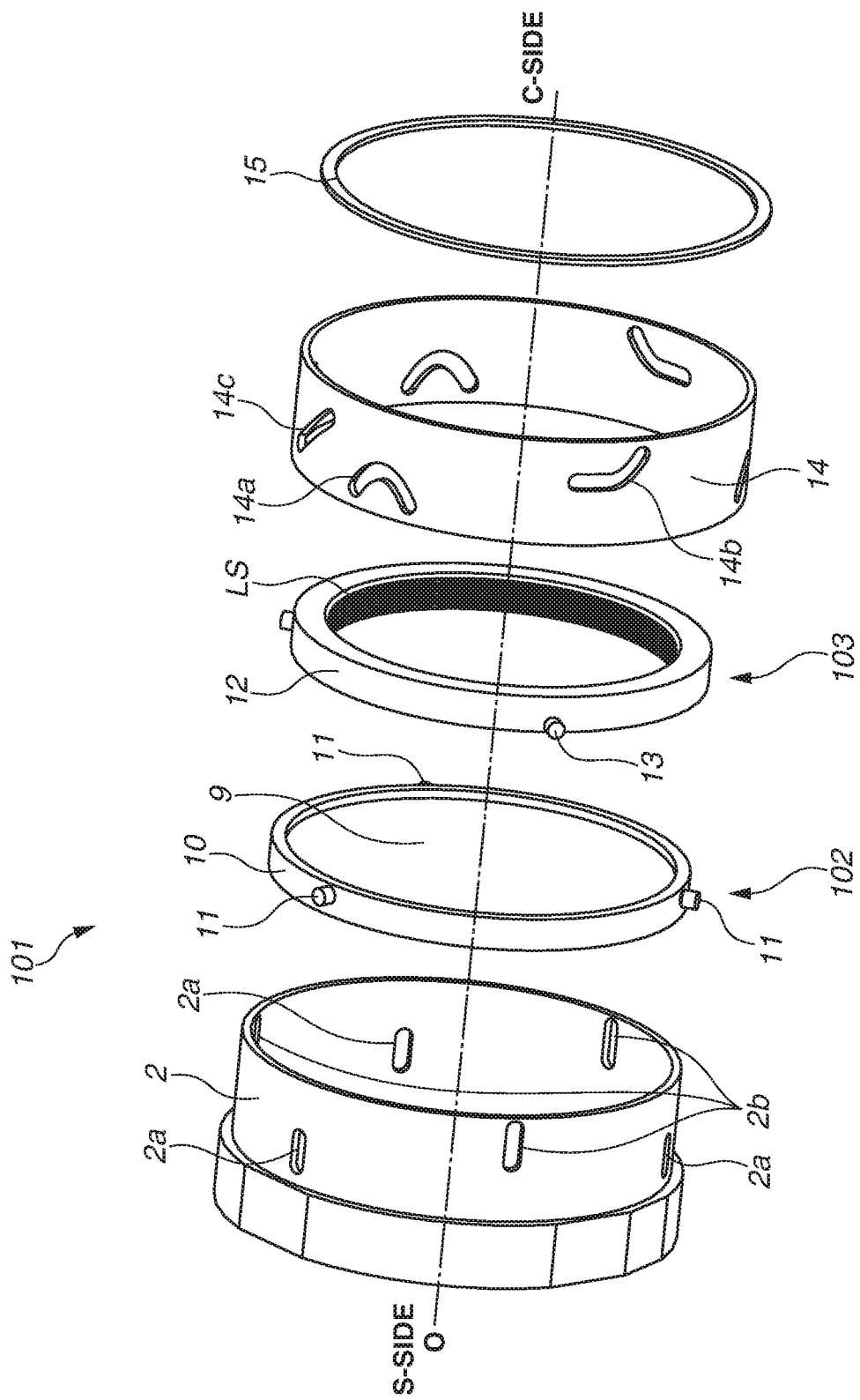
FIG. 3 is an exploded diagram illustrating the main portions of the lens unit according to the first exemplary embodiment.

A configuration of a sub-lens holding portion or a holder 102 and a configuration of a balancer portion or a balancer 103 included in the lens unit 101 will be described with reference to FIGS. 2 and 3. FIG. 3 is an exploded diagram illustrating main portions of the lens unit 101.

As illustrated in FIG. 3, the sub-lens holding portion 102 according to the present exemplary embodiment is constituted of a sub-lens (second lens) 9 and a lens barrel 10 that holds the sub-lens 9. The lens barrel 10 includes cam followers or cam rollers 11 arranged at three positions. The camp followers 11 respectively engage with three straight grooves 2a formed in the lens barrel 2 so that movement of the sub-lens holding portion 102 in the optical axis O direction is guided thereby.

The balancer portion 103 includes a weight 12 and cam followers 13 fixed on the weight 12 at three positions. The balancer portion 103, described below, assists driving of the lens unit 101. The cam followers 13 respectively engage with three straight grooves 2b formed in the lens barrel 2 so that movement of the weight 12 in the optical axis O direction is guided thereby. A light shielding groove LS is formed on a surface on an inner side (optical axis O side) of the weight 12.

A cam barrel (second power transmission portion or device) 14 is a cam member that determines driving amounts of the sub-lens holding portion 102 and the balancer portion 103. Driving cam grooves 14a that engage with the cam followers 11 and assisting cam grooves 14b that engage with the cam followers 13 are formed in the cam barrel 14. Each of the sub-lens holding portion 102 and the balancer portion 103 is engaged with the cam barrel 14 at three positions thereof arranged at equiangular intervals in the circumferential direction. With this configuration, tilt of the sub-lens holding portion 102 and the balancer portion 103 relative to the optical axis O can be reduced.

In the present exemplary embodiment, each of the cam grooves is a hole that penetrates the cylindrical-shaped cam barrel 14. However, each of the cam grooves may be formed into a shape that does not penetrate the cam barrel 14 and has a bottom surface.

The cam barrel 14 is held rotatably about the optical axis O with respect to the lens barrel 2 at a fixed position (a position restricted in the optical axis direction) with a holding ring 15.

When the cam barrel 14 is rotated, the sub-lens holding portion 102 having the cam followers 11 is moved relative to the main lens 1 in the optical axis O direction interlocked with rotation of the cam barrel 14. With this movement, a distance between the main lens 1 and the sub-lens 9 is changed. Similarly, when the cam barrel 14 is rotated, the balancer portion 103 having the cam followers 13 is moved relative to the main lens 1 in the optical axis O direction interlocked with the rotation of the cam barrel 14 so that a positional relationship thereof is changed.

Further, as illustrated in FIG. 2, the frame 5 has a fixing pin 16 that is engaged with a driven cam groove 14c formed in the cam barrel 14.

When the entire lens unit 101 is driven in the optical axis O direction interlocked with the rotation of the male helicoid screw member 7, the cam barrel 14 is moved relative to the fixing pin 16. At this time, the cam barrel 14 is rotated because the driven cam groove 14c is pushed by the fixing pin 16 in a direction in which the cam barrel 14 is rotated. When the cam barrel 14 is rotated, the sub-lens holding portion 102 and the balancer portion 103 are moved in the optical axis O direction according to respective shapes of the driving cam grooves 14a and the assisting cam grooves 14b.

<Movement of Lenses>

Figure 5A:
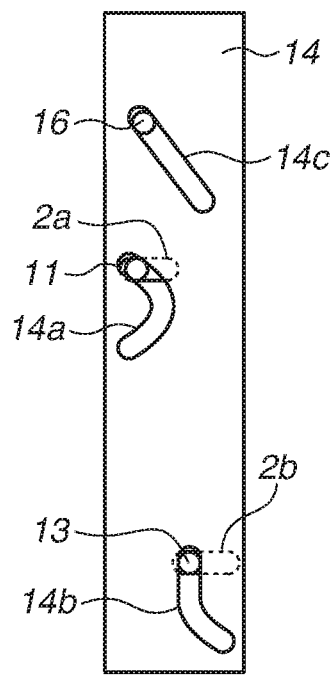
FIGS. 5A, 5B, and 5C are development diagrams illustrating a cam barrel viewed from an outside.
Figure 5B:
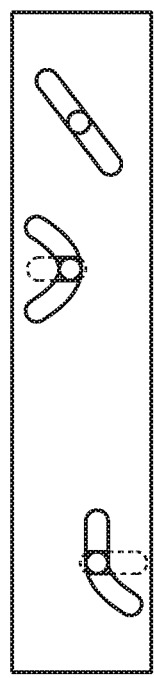
Figure 5C:
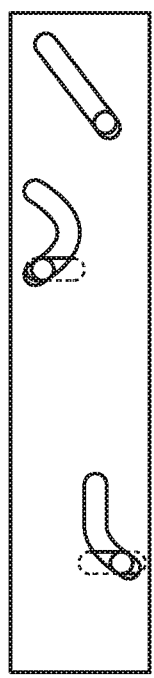

FIGS. 4A, 4B, 4C, 5A, 5B, and 5C are diagrams illustrating movement of each of the lenses. FIGS. 4A, 4B, and 4C are cross-sectional diagrams of the lens unit 101 taken along the line A-A in FIG. 1. FIGS. 5A, 5B, and 5C are diagrams illustrating development views of the cam barrel 14 viewed from the outside.

FIGS. 4A, 4B, 4C, 5A, 5B, and 5C illustrate states where the lens unit 101 is moved, through a focus operation, to an initial position (FIGS. 4A and 5A) closest to the C-side of the optical axis O, an end position (FIGS. 4C and 5C) closest to the S-side of the optical axis O, and an intermediate position (FIGS. 4B and 5B) intermediate between the initial position and the end position. FIGS. 4A, 4B, and 4C illustrate movement of each of the lenses. FIGS. 5A, 5B, and 5C illustrate movement of the cam followers 11 (connected to the sub-lens 9), the cam followers 13 (connected to the weight 12), and the fixing pin 16 (fixed on the frame 5) that respectively engage with the driving cam grooves 14a, the assisting cam grooves 14b, and the driven cam groove 14c of the cam barrel 14.

As described above, the sub-lens 9 is configured in such a state that a distance between the main lens 1 and the sub-lens 9 is changed according to focus driving of the lens unit 101 in order to suppress fluctuation of aberration caused by the focus driving thereof.

<Mechanism for Reducing Driving Load of Lens Unit>

By using the above-described configuration, a mechanism for reducing a driving load of the lens unit 101 will be described with reference to FIGS. 6A, 6B, 7A, and 7B. The driving load increases when the lens apparatus is placed non-horizontally due to the gravitational force and mass of the lens unit 101. The driving load of the lens unit 101 refers to load torque applied to rotation of the male helicoid screw member 7.

FIGS. 6A and 6B are diagrams illustrating side views of the main portions of the lens unit 101 illustrating a state where the lens apparatus is operated in a non-horizontal attitude in which the S-side of the lens apparatus is held in a vertically upward direction at an angle θ from a horizontal plane. FIGS. 7A and 7B are diagrams illustrating development views of the cam barrel 14 viewed from the outside in states illustrated in FIGS. 6A and 6B. The lens unit 101 is moved from the initial position to the intermediate position in FIGS. 6A and 7A and is moved from the intermediate position to the end position in FIGS. 6B and 7B.

In the states illustrated in FIGS. 6A and 6B, a force G0 generated due to the gravitational force G and the mass of the lens unit 101 is a load applied to the male helicoid screw member 7.

<When Lens Unit is Moved from Initial Position to Intermediate Position>

First, a mechanism for reducing a load when the lens unit 101 is moved from the initial position to the intermediate position, i.e., to the S-side against the gravitational force, will be described with reference to FIGS. 6A and 7A.

In a state illustrated in FIG. 6A, the lens unit 101 receives the gravitational force in a direction indicated by an arrow G in FIG. 6A.

Focusing on the sub-lens holding portion 102, as illustrated in FIG. 7A, the sub-lens holding portion 102 receives a force G1 caused by the gravitational force and mass of the sub-lens 9. A direction of the force G1 is the same as a direction of the force G0 applied to the lens unit 101.

At this time, each of the cam followers 11 arranged on the sub-lens holding portion 102 transmits the force G1 to the cam barrel 14 via the driving cam groove 14a. In the state illustrated in FIG. 7A, a tangential line of the driving cam groove 14a is inclined in an orientation expressed by an angle ε1 relative to the direction of the force G1 at an engagement position of the cam follower 11. Accordingly, the driving cam groove 14a converts the force G1 into a force W1a.

A direction of the force W1a is the same as the direction in which the cam barrel 14 is rotated by the fixing pin 16 when the lens unit 101 is driven in a direction against the gravitational force. This direction of the force W1a is referred to as a forward rotation direction of the cam barrel 14.

When the cam barrel 14 receives the force W1a and rotates in the forward rotation direction, the force W1a is transmitted to the fixing pin 16 through the driven cam groove 14c. However, because the fixing pin 16 is fixed to the frame 5, the cam barrel 14 receives a reactive force from the fixing pin 16.

Herein, in a state illustrated in FIG. 7A, the driven cam groove 14c is inclined in an orientation expressed by an angle γ relative to the direction of the force W1a at the engagement position of the fixing pin 16. Accordingly, the driven cam groove 14c converts the force W1a into a force Fa.

The force Fa has a direction opposite to the direction of the force G0 (G1) caused by the gravitational force, and the force Fa acts against the force G0 (G1). In other words, the force Fa assists the male helicoid screw member 7 to move the lens unit 101 from the initial position to the intermediate position.

Through the above-described mechanism, in a state illustrated in FIG. 6A according to the present exemplary embodiment, mass of the sub-lens holding portion 102 acts favorably so as to reduce the load applied to the male helicoid screw member 7.

<When Lens Unit is Moved from Intermediate Position to End Position>

Next, a mechanism for reducing a load when the lens unit 101 is moved from the intermediate position to the end position, i.e., to the S-side against the gravitational force, will be described with reference to FIGS. 6B and 7B.

Focusing on the sub-lens holding portion 102, as illustrated in FIG. 7B, the sub-lens holding portion 102 receives the force G1 caused by the gravitational force and the mass of the sub-lens 9.

Each of the cam followers 11 arranged to the sub-lens holding portion 102 transmits the force G1 to the cam barrel 14 via the driving cam groove 14a. However, in a state illustrated in FIG. 7B, a tangential line of the driving cam groove 14a is inclined in an orientation opposite to the state illustrated in FIG. 7A (i.e., an orientation expressed by an angle ε2) relative to the direction of the force G1 at the engagement position of the cam follower 11.

Accordingly, the driving cam groove 14a converts the force G1 into a force W1b acting in a direction opposite to the direction in the state illustrated in FIG. 7A. The direction of the force W1b is a direction not effective for reducing the load. This direction of the force W1b is referred to as a backward rotation direction of the cam barrel 14.

Meanwhile, focusing on the balancer portion 103, the balancer portion 103 receives a force G2 caused by the gravitational force and mass of the weight 12.

In a state illustrated in FIG. 7B where the lens unit 101 is moved against the gravitational force from the intermediate position to the end position, the assisting cam groove 14b has a shape inclining and extending toward the direction of the force G2 in a region R where the cam follower 13 engages therewith. When a plane passing through the region R and orthogonal to the optical axis is denoted by P, an acute angle of angles at which the assisting cam groove 14b intersects with the plane P (i.e., an angle between a tangential line direction of the assisting cam groove 14b and the plane P at an intersecting point thereof) is denoted by ξ. In the present exemplary embodiment, the angle ξ can be acquired in a counterclockwise direction using the plane P as a reference. The orientation of this inclination is referred to as a positive inclination (see a coordinate D in FIG. 7A).

Due to the positive inclination of the assisting cam groove 14b, the force G2 is converted into a force W2b that is in a direction opposite to the direction of the force W1b. In other words, the direction of the force W2b is the forward rotation direction effective for reducing the load.

Accordingly, in the state illustrated in FIG. 7B, the force W1b is applied to the cam barrel 14 in the backward rotation direction and the force W2b is applied thereto in the forward rotation direction.

In the present exemplary embodiment, the force W2b acting in the forward rotation direction is set to be larger than the force W1b acting in the backward rotation direction (W2b>W1b) by the angle ξ of the inclination in the region R. Accordingly, rotation of the cam barrel 14 in the forward rotation direction is assisted.

In the present exemplary embodiment, the driven cam groove 14c has a shape inclining and extending toward the forward rotation direction. When an acute angle of angles at which the driven cam groove 14c intersects with the plane P is denoted by γ, the angle γ can be acquired in a counterclockwise direction relative to the plane P1 orthogonal to the optical axis. In other words, both of the driven cam groove 14c and the assisting cam groove 14b in the region R have orientations of the positive inclination.

Due to the inclination of the driven cam groove 14c at the angle γ, the cam barrel 14 receives a force Fb from the fixing pin 16 fixed to the frame 5.

The force Fb has a direction opposite to the direction of the force G0 (G1 or G2) caused by the gravitational force, and the force Fb acts against the force G0 (G1 or G2). In other words, the force Fb assists the male helicoid screw member 7 to move the lens unit 101 from the intermediate position to the end position.

As described above, in the present exemplary embodiment, the balancer portion 103 is configured in such a manner that the gravitational force acting on the balancer portion 103 can be used by converting and combining the gravitational force with the driving force of the male helicoid screw member 7.

A load applied to the male helicoid screw member 7 is similarly increased if the lens unit 101 is driven oppositely in a direction of the C-side in a state where the C-side of the lens apparatus is held in a vertically upward direction at an angle θ from the horizontal plane illustrated in FIG. 6A.

However, in the above-described case, the forces Fa and Fb act to reduce the load applied to the male helicoid screw member 7.

Specifically, in the above-described case, the forces indicated by the arrows G1, W1a, G2, W1b, and W2b in FIGS. 7A and 7B act in directions opposite to the directions indicated in FIGS. 7A and 7B. Therefore, the forces Fa and Fb also act in the opposite directions to assist the lens unit 101 to be driven to the C-side.

According to the present disclosure, the load caused by the gravitational force applied to the male helicoid screw member 7 can be reduced using the gravitational force regardless of whether the subject S side thereof is held upward or downward while the lens apparatus is being used.

<Condition for Reducing Load>

In order to reduce the load caused by the gravitational force applied to the male helicoid screw member 7, a force has to be generated in a direction opposite to the direction of the force G0 caused by the gravitational force.

A force with which the sub-lens holding portion 102 causes the cam barrel 14 to rotate is defined as W1, a force with which the balancer portion 103 causes the cam barrel 14 to rotate is defined as W2, and a rising angle of the driven cam groove 14c is defined as γ when counterclockwise rotation is taken as a positive orientation. Further, as illustrated in the coordinate D in FIG. 7A, a sign is defined in such a manner that the forward rotation direction of the cam barrel 14 is the positive rotation and the backward rotation direction thereof is the negative rotation. Further, the sign is defined in such a manner that an orientation on a subject S side in the optical axis O direction is the positive orientation and an orientation on an image sensor C-side opposite to the positive orientation is the negative orientation.

At this time, a force F applied to the cam barrel 14 from the fixing pin 16 via the driven cam groove 14c is expressed by the following formula 1.

$$F=(W1+W2)\tan\gamma \quad (1)$$

When the load caused by the gravitational force that is applied to the male helicoid screw member 7 in the optical axis direction is L, the force F is defined to constantly act in the orientation opposite to the orientation of the load L. This can be expressed by the following formula 2.

$$|L|>|L+F| \quad (2)$$

The formula 2 defines a direction in which a resultant force of the force (W1), with which the sub-lens holding portion 102 causes the cam barrel 14 to rotate, and the force (W2), with which the balancer portion 103 causes the cam barrel 14 to rotate, caused by the gravitational force act. This indicates that the direction of the resultant force is the same as the direction in which the cam member is rotated when the lens unit 101 is driven in the direction against the gravitational force. Accordingly, each component has to be set to satisfy the formula 2.

For example, as a setting parameter, it is possible to change a shape of the assisting cam groove 14b at the engagement position of the cam follower 13 of the balancer portion 103. If assisting force is not sufficient, the inclination angle ξ of the assisting cam groove 14b may be increased. Further, for example, mass of the balancer portion 103 can be changed. If importance is placed on focus driving operation performed in a non-horizontal attitude, weight of the sub-lens holding portion 102 may be increased if the assisting force is not sufficient.

<Effect>

In the present exemplary embodiment, when the lens unit 101 is driven from the C-side to the S-side, an effect of suppressing a load by the fixing pin 16 can be acquired from the sub-lens holding portion 102 or the balancer portion 103 in the entire range relating to driving of the lens unit 101.

In particular, conventionally, a load applied to the helicoid screw has been increased considerably due to weight of the sub-lens in a case where the sub-lens within the lens unit is relatively driven in a same direction when the lens unit is driven in the direction against the gravitational force. In other words, in a state illustrated in FIG. 7B, because the sub-lens holding portion 102 within the lens unit 101 is also moved in the direction against the gravitational force in addition to the lens unit 101, the driving load is increased considerably.

To deal with this, in the present disclosure, increase of the load applied to the helicoid screw can be suppressed by providing a balancer portion. As described above, the effect of suppressing the increase of the load according to the present disclosure is exerted particularly in a lens apparatus having a configuration as the above (i.e., configuration including a focus lens group divided into two types of lenses of a main lens and a sub-lens and having a distance between the lenses that is changed).

In the present exemplary embodiment, in a state illustrated in FIG. 5A where the sub-lens 9 is relatively driven in the opposite direction within the lens unit 101 when the lens unit 101 is driven in the direction against the gravitational force, the force G2 is not converted into force acting in the rotation direction of the cam barrel 14. This is because the assisting cam groove 14b has a shape orthogonal to the direction of the force G2 at the engagement position of the cam follower 13. In this case as well, as described above, the sub-lens 9 contributes to reduction of the load applied to the helicoid screw. Therefore, in the lens barrel according to the present exemplary embodiment, the load applied to the helicoid screw, which is generated when the lens unit 101 is driven in the direction against the gravitational force, can be reduced in a range where the lens unit 101 is driven regardless of the position of the lens unit 101.

However, for example, even in the state illustrated in FIG. 5A, the load can be further reduced if the assisting cam groove 14b is formed to have the positive inclination to cause the force G2 caused by the gravitational force to be converted into a force having a direction the same as that of the force W1a.

As described above, in the lens apparatus according to the present exemplary embodiment, power consumption of a motor used in an electric-operated lens apparatus can be suppressed, and focus driving speed can be increased regardless of whether the lens apparatus is operated manually or electrically.

Further, in the present exemplary embodiment, the focus lens group is provided on the S-side (i.e., a side of a subject) of the balancer portion 103. If a large-aperture lens is used in the focus lens group, it is difficult to keep the center of balance because the lens apparatus becomes heavy on the S-side thereof. Therefore, as described in the present exemplary embodiment, if the balancer portion 103 is held on the C-side of the lens unit 101, it is possible to keep the center of balance of the entire lens unit 101 as well as the center of balance of the entire lens apparatus even if the large-aperture lens is used in the focus lens group. Accordingly, it is possible to provide a lens apparatus that can be easily operated by the user.

Further, in the present exemplary embodiment, the balancer portion 103 is held within the lens barrel 2 and the cam barrel 14. According to the present exemplary embodiment, because the balancer portion 103 is stored within the lens barrel 2, it is possible to suppress the load while preventing the lens from being increased in size.

Further, in the present exemplary embodiment, the step-like light-shielding groove (light-shielding line) LS is formed on an inner circumferential surface of the weight 12 (see FIG. 3). With this configuration, in addition to the function of reducing the load applied to the male helicoid screw member 7, the weight 12 has a function of preventing entered light from reflecting inside and passing through the lens apparatus to reach the image sensor or a function of reducing generation of stray light caused thereby. In addition, for example, a similar effect can be acquired by applying surface processing such as an antireflection coating and forming fine irregularities on the inner side of the weight 12. Further, the balancer portion 103 may have an optical member such as a lens.

Hereinafter, a lens apparatus according to a second exemplary embodiment of the present disclosure will be described with reference to FIGS. 8 to 14.

Similar to the first exemplary embodiment, the lens apparatus according to the present exemplary embodiment is a zoom lens, and driving operation of a lens group will be described by taking a focus lens group as an example.

<Configuration of Lens Unit>

Figure 8:
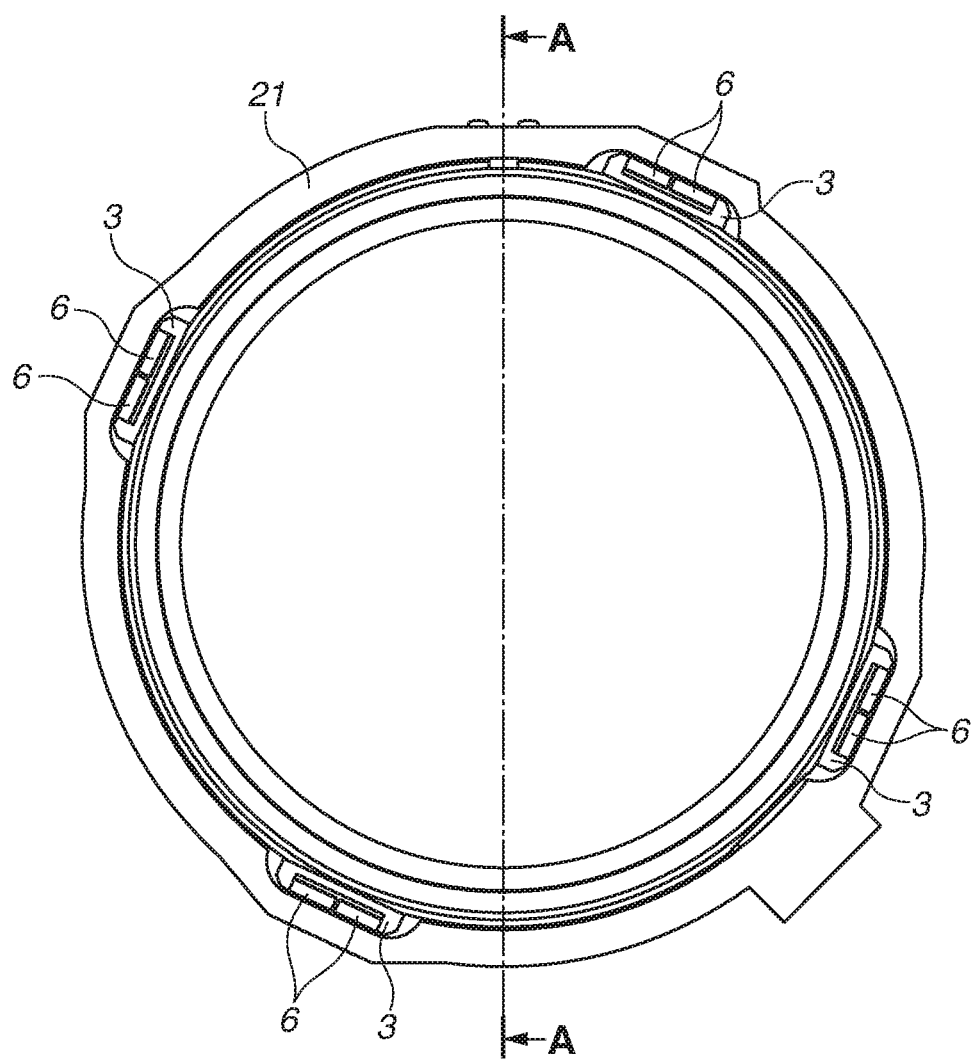
FIG. 8 is a diagram illustrating a front view of a lens apparatus according to a second exemplary embodiment.
Figure 9:
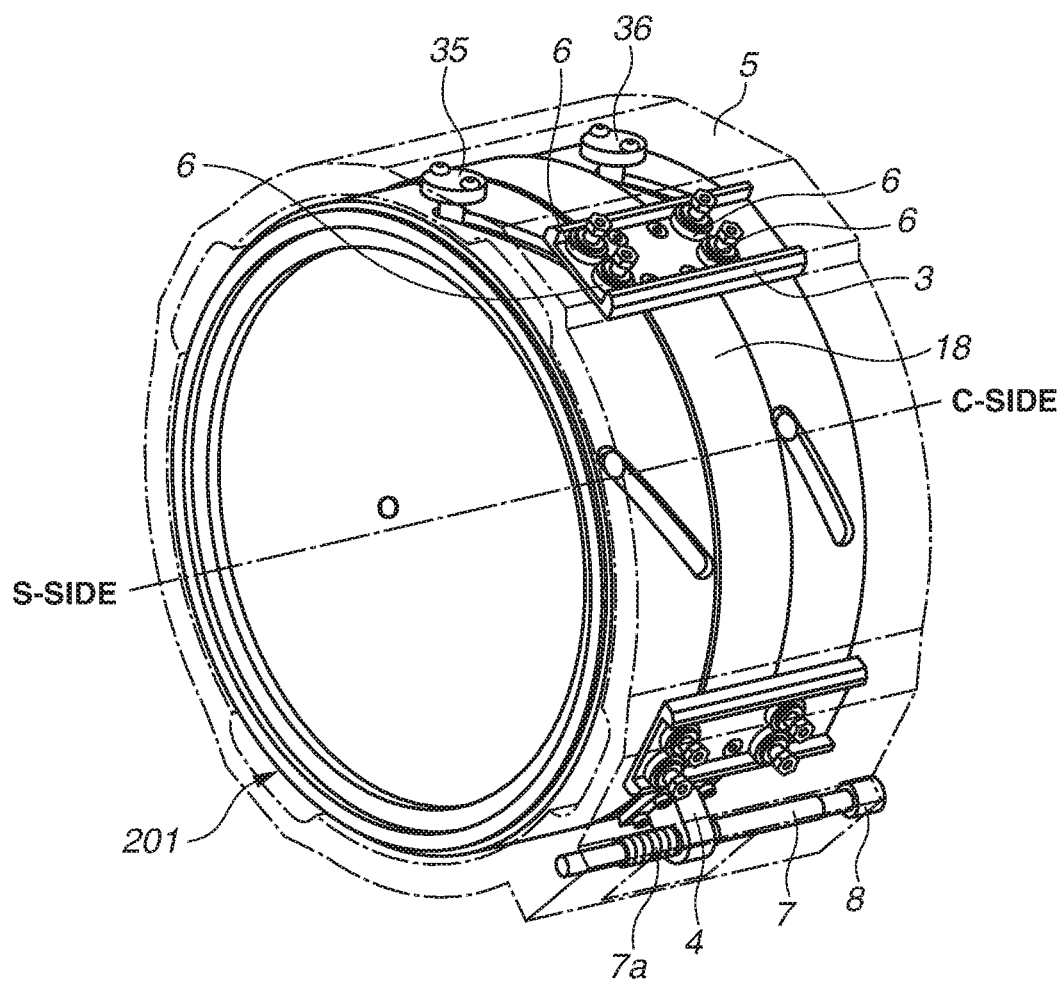
FIG. 9 is a diagram illustrating a perspective view of main portions of a lens unit according to the second exemplary embodiment.
Figure 10:
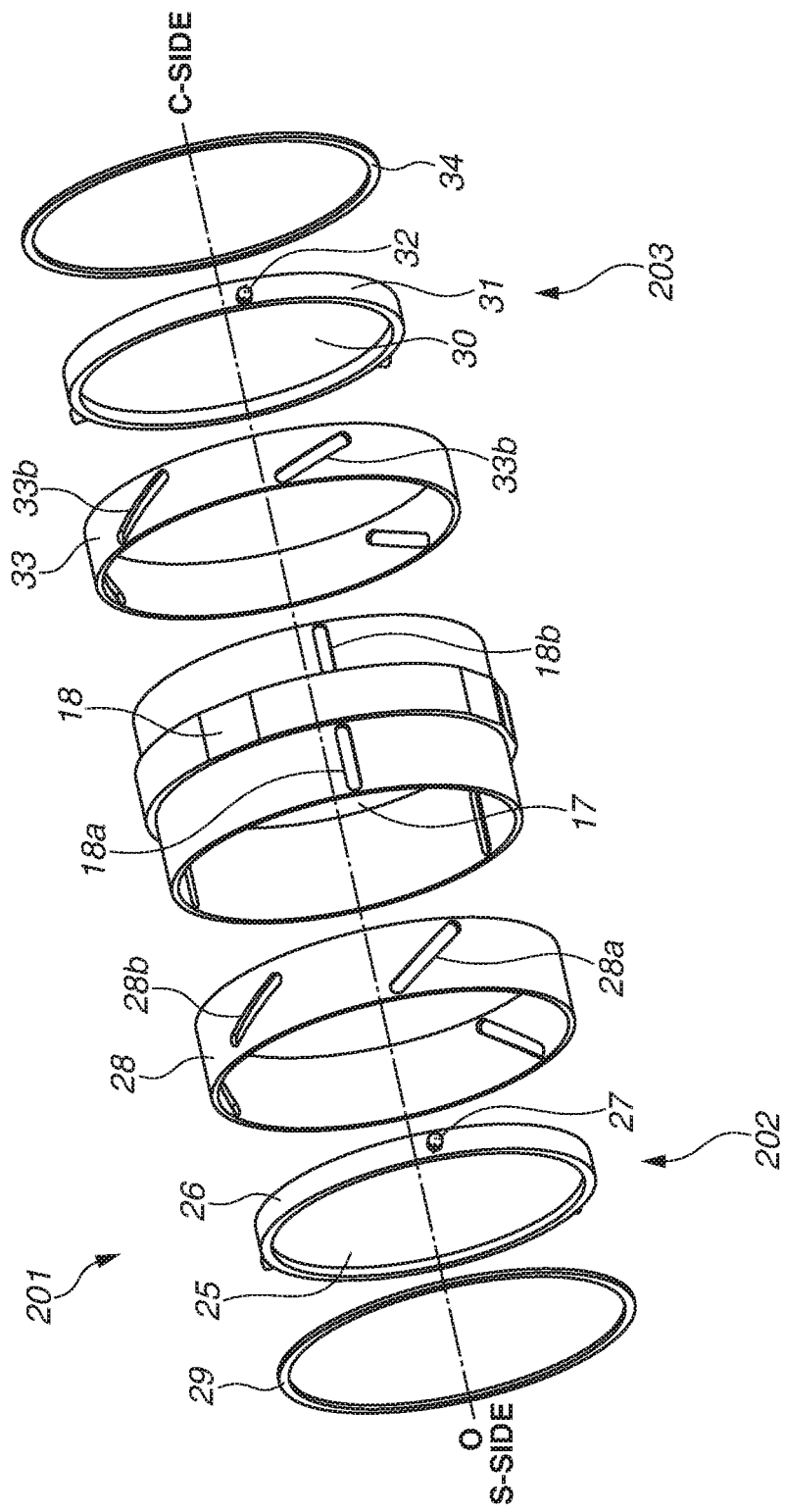
FIG. 10 is a diagram illustrating an exploded perspective view of the lens unit according to the second exemplary embodiment.

First, a configuration of a lens unit 201 as a focus lens unit including a focus lens group will be described with reference to FIGS. 8 to 10. FIG. 8 is a diagram illustrating a front view of the lens unit 201. FIG. 9 is a perspective diagram illustrating main portions of the lens unit 201. FIG. 10 is an exploded diagram illustrating the main portions of the lens unit 201.

As illustrated in FIG. 10, different from the first exemplary embodiment, the focus lens group according to the present exemplary embodiment is constituted of three lenses, i.e., a main lens (first lens) 17, a sub-lens (second lens) 25, and a sub-lens (third lens) 30. The sub-lens 25 is provided on the S-side, which is a side of a subject relative to the main lens 17, and the sub-lens 30 is provided on the C-side on the opposite side thereof in the optical axis direction. The main lens 17 is held by a lens barrel 18.

<Configuration of Sub-lens Holding Portion>

A configuration of a sub-lens holding portion 202 and a balancer portion 203 included in the lens unit 201 will be described with reference to FIG. 10.

The sub-lens holding portion 202 is constituted of the sub-lens 25 and a lens barrel 26 for holding the sub-lens 25, and is held on the subject S-side of the lens unit 201. The lens barrel 26 includes cam followers 27 arranged at three positions. The cam followers 27 respectively engage with three straight grooves 18a formed in the lens barrel 18 so that movement of the sub-lens holding portion 202 in the optical axis O direction is guided thereby.

A cam barrel (second power transmission portion) 28 is a cam member that drives the sub-lens holding portion 202 to determine a position of the sub-lens 25 relative to the main lens 17 in the optical axis O direction. Driving cam grooves 28a that engage with the cam followers 27 are formed in the cam barrel 28. The cam barrel 28 is held rotatably about the optical axis O with respect to the lens barrel 18 at a fixed position with a holding ring 29.

When the cam barrel 28 is rotated, the sub-lens holding portion 202 having the cam followers 27 is moved relative to the main lens 17 in the optical axis O direction interlocked with the rotation of the cam barrel 28.

Further, as illustrated in FIG. 9, the frame 5 has a fixing pin 35 that is engaged with a driven cam groove 28b formed in the cam barrel 28.

When the entire lens unit 201 is driven in the optical axis O direction interlocked with rotation of the male helicoid screw member 7, the cam barrel 28 is moved relative to the fixing pin 35. At this time, the cam barrel 28 is rotated because the driven cam groove 28b is pushed by the fixing pin 35 in a direction in which the cam barrel 28 is rotated. When the cam barrel 28 is rotated, the sub-lens holding portion 202 is moved in the optical axis O direction according to the shape of the driven cam groove 28b.

Meanwhile, the balancer portion 203 of the present exemplary embodiment is constituted of the sub-lens 30 and a lens barrel 31 that holds the sub-lens 30, and is held on the C-side of the lens unit 201. The lens barrel 31 includes cam followers 32 arranged at three positions. The cam followers 32 respectively engage with three straight grooves 18b formed in the lens barrel 18 so that movement of the balancer portion 203 in the optical axis O direction is guided thereby.

A cam barrel (second power transmission portion) 33 is a cam member that drives the balancer portion 203 to determine a position relative to the main lens 17 in the optical axis O direction. Assisting cam grooves 33a that engage with the cam followers 32 are formed in the cam barrel 33. The cam barrel 33 is held rotatably about the optical axis O with respect to the lens barrel 18 at a fixed position with a holding ring 34.

When the cam barrel 33 is rotated, the balancer portion 203 having the cam followers 32 is moved relative to the main lens 17 in the optical axis O direction interlocked with the rotation of the cam barrel 33.

Further, as illustrated in FIG. 9, the frame 5 has a fixing pin 36 that engages with a driven cam groove 33b formed in the cam barrel 33.

When the entire lens unit 201 is driven in the optical axis O direction interlocked with the rotation of the male helicoid screw member 7, the cam barrel 28 is moved relative to the fixing pin 35. At this time, the cam barrel 33 is rotated because the driven cam groove 33b is pushed by the fixing pin 36 in a direction in which the cam barrel 33 is rotated. When the cam barrel 33 is rotated, the balancer portion 203 is moved in the optical axis O direction according to the shape of the driven cam groove 33b.

<Movement of Lenses>

Figure 11A:
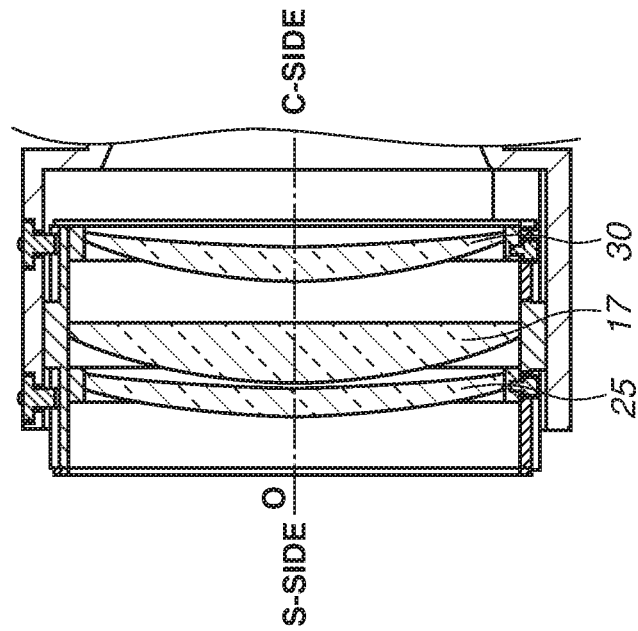
FIGS. 11A and 11B are diagrams illustrating cross-sectional views of the lens unit taken along a line A-A in FIG. 8.
Figure 11B:
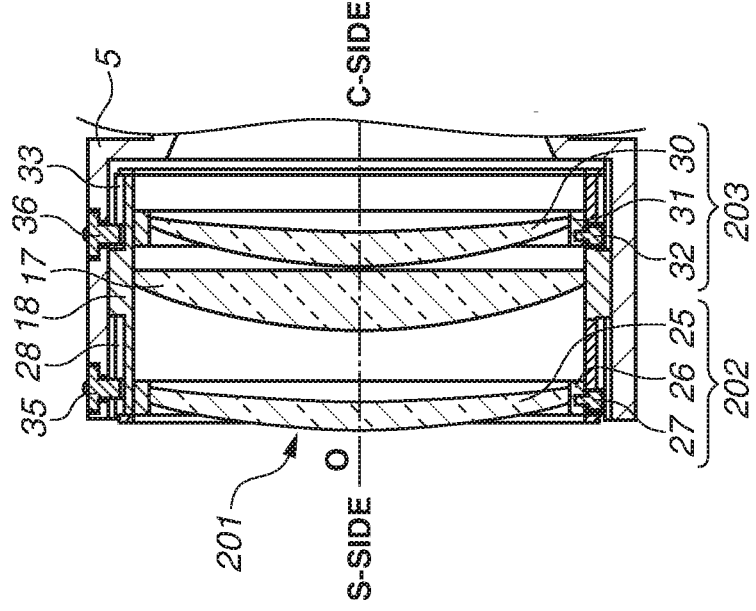
Figure 12B:
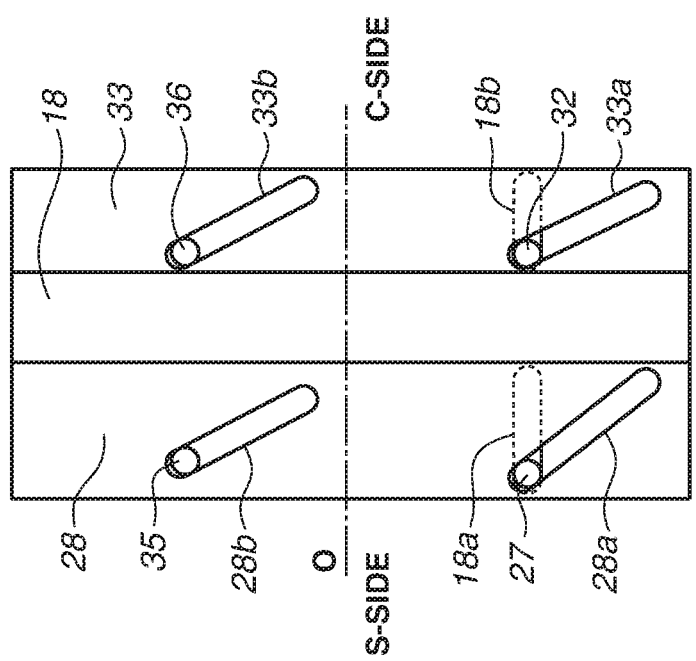
FIGS. 12A and 12B are development diagrams illustrating a cam barrel according to the second exemplary embodiment viewed from an outside.
Figure 12A:
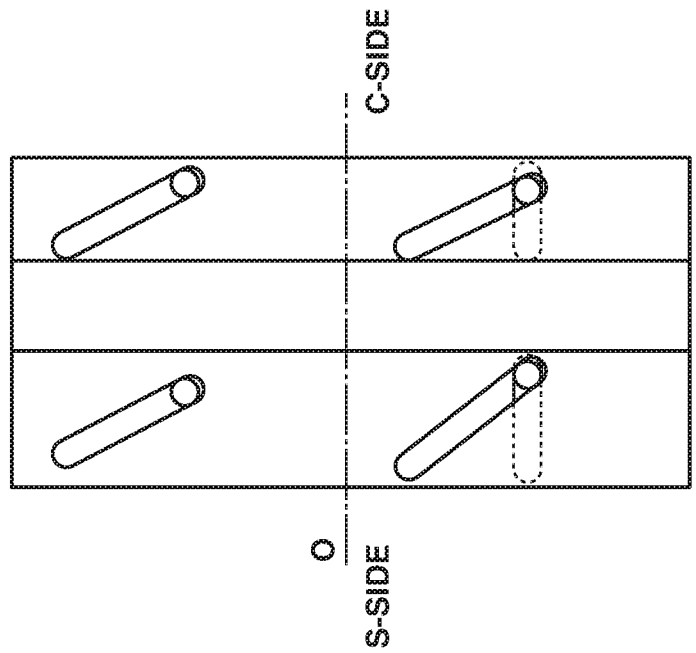

FIGS. 11A, 11B, 12A, and 12B are diagrams illustrating movement of each of the lenses. FIGS. 11A and 11B are cross-sectional diagrams of the lens unit 201 taken along a line A-A in FIG. 8. FIGS. 12A and 12B are diagrams illustrating development views of the cam barrels 28 and 33 viewed from the outside. FIGS. 11A, 11B, 12A, and 12B illustrate states where the lens unit 201 is moved to an initial position (FIGS. 11A and 12A) closest to the S-side of the optical axis O, and an end position (FIGS. 11B and 12B) closest to the C-side through focus operation. FIGS. 11A and 11B illustrate movement of each of the lenses. FIGS. 12A and 12B illustrate movement of the cam followers and the fixing pins that respectively engage with the cam grooves.

As described above, each of the sub-lens holding portion 202 and the balancer portion 203 including the sub-lens 30 is configured in such a state that a distance between the sub-lens and the main lens 17 is changed according to focus operation of the entire lens unit 201 in order to suppress fluctuation of aberration caused by the focus operation.

<Mechanism for Reducing Load of Lens Unit>

A mechanism for reducing a load caused by the gravitational force applied to the male helicoid screw member 7 when the lens apparatus is placed non-horizontally will be described with reference to FIGS. 13 and 14.

Figure 13:
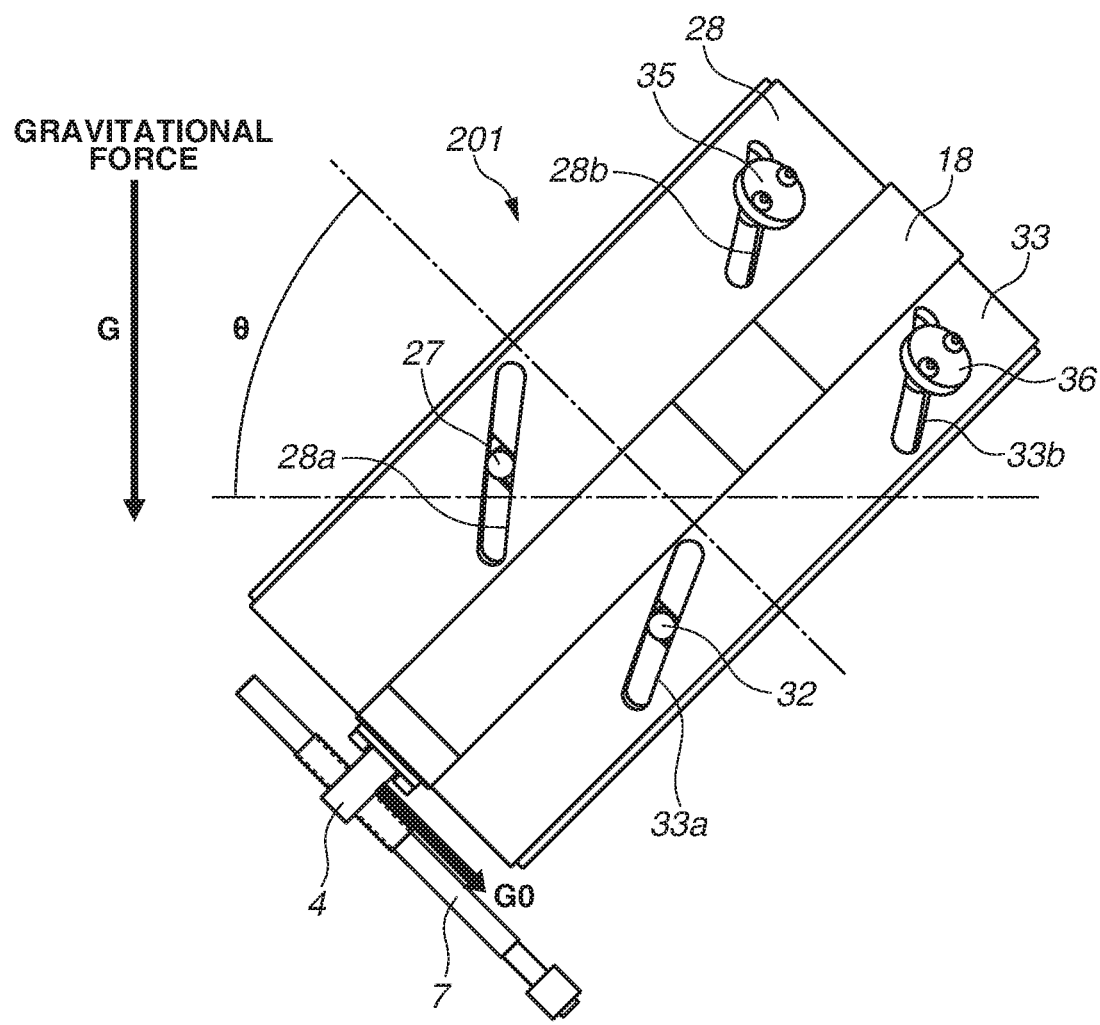
FIG. 13 is a diagram illustrating a side view of the lens unit when the lens apparatus according to the second exemplary embodiment is held non-horizontally.

FIG. 13 is a side view of main portions of the lens unit 201 illustrating a state where the lens unit 201 is operated in a non-horizontal attitude in which the S-side of the lens apparatus is held in a vertically upward direction at an angle θ from a horizontal plane. FIG. 14 is a diagram illustrating a development view of the cam barrel in FIG. 3 viewed from the outside. The lens unit 201 in FIGS. 13 and 14 illustrates a state where the lens unit is moved from the initial position to the end position.

When the lens unit 201 is driven from the initial position to the end position by the male helicoid screw member 7 in a direction against the gravitational force G, the force G0 in a direction opposite to the driving direction is applied thereto caused by the gravitational force and mass of the lens unit 201. This force becomes a load when the male helicoid screw member 7 is rotated.

At this time, focusing on the balancer portion 203, as illustrated in FIG. 14, the balancer portion 203 receives the force G2 caused by the gravitational force G and mass of the sub-lens 30. A direction of the force G1 is the same as a direction of the force G0 applied to the lens unit 201.

At this time, the cam follower 32 arranged on the balancer portion 203 transmits the force G2 to the cam barrel 33 via the assisting cam groove 33a. The assisting cam groove 33a has a shape inclining and extending toward a direction of the force G2 in the entire region used for the rotation of the cam barrel 33 (the assisting cam groove 33a does not have to be inclined in a region not used for the rotation of the cam barrel 33). When a plane orthogonal to the optical axis and intersecting with the assisting cam groove 33a is denoted by P2, an acute angle of angles at which the assisting cam groove 33a intersects with the plane P2 is denoted by ζ2. In the present exemplary embodiment, the angle ζ2 can be acquired in a counterclockwise direction using the plane P2 as a reference, and the orientation of this inclination is referred to as a positive inclination (see the coordinate D in FIG. 14).

Due to the positive inclination of the assisting cam groove 33a, the force G2 is converted into a force W2 applied in the rotation direction of the cam barrel 33. A direction of the force W2 is the same as the direction in which the cam barrel 33 is rotated by the fixing pin 36 when the lens unit 201 is driven in the direction against the gravitational force. In other words, the cam barrel 33 uses the force G2 caused by the gravitational force by converting the force G2 into driving force for rotating the cam barrel 33. The direction of the force W2 is referred to as a forward rotation direction (of the cam barrel 33).

When the cam barrel 33 receives the force W2 and rotates in the forward rotation direction, the force W2 is transmitted to the fixing pin 36 through the driven cam groove 33b. However, because the fixing pin 36 is fixed to the frame 5, the cam barrel 33 receives reactive force from the fixing pin 36.

Herein, a direction in which the driven cam groove 33b extends is inclined toward the direction of the force W2. When an acute angle of the angles at which the driven cam groove 33b intersects with the plane P2 is denoted by η, the angle η can be acquired in the counterclockwise direction relative to the plane P2. In other words, the driven cam groove 33b has positive inclination the same as that of the assisting cam groove 33a. Due to this positive inclination, the driven cam groove 33b converts the force W2 into the force F2.

The force F2 has a direction opposite to the direction of the force G0 (G2) caused by the gravitational force. In other words, the force F2 assists the male helicoid screw member 7 to move the lens unit 201 from the initial position to the intermediate position.

Through the above-described mechanism, the load caused by the gravitational force applied to the male helicoid screw member 7 is reduced because the lens unit 201 receives the force F2 from the balancer portion 203 in the direction moving against the gravitational force.

<Supplementation>

In the present exemplary embodiment, the balancer portion 203 may serve as a sub-lens holding portion. In this case, the sub-lens holding portion 202 is used as a balancer portion. In other words, in the present exemplary embodiment, the driving cam groove 28a also serves as an assisting cam, and the assisting cam groove 33a also serves as a driving cam.

Hereinafter, a mechanism of the sub-lens holding portion 202 functioning as the balancer portion will be described.

Focusing on the sub-lens holding portion 202, as illustrated in FIG. 14, the sub-lens holding portion 202 receives the force G1 caused by the gravitational force G and mass of the sub-lens 25.

At this time, the cam follower 27 arranged on the sub-lens holding portion 202 transmits the force G1 to the cam barrel 28 via the driving cam groove 28a. The driving cam groove 28a has a shape inclining and extending toward a direction of the force G1 in the entire region used for the rotation of the cam barrel 28. When a plane passing through the driving cam groove 28a and orthogonal to the optical axis is denoted by P1, an acute angle of the angles at which the driving cam groove 28a intersects with the plane P1 is denoted by $\zeta 1$. In the present exemplary embodiment, the angle $\zeta 1$ can be acquired in the counterclockwise direction using the plane P1 as a reference, and the orientation of this inclination is referred to as the positive inclination.

Due to the positive inclination of the driving cam groove 28a, the force G1 is converted into the force W1 applied in the rotation direction of the cam barrel 28. A direction of the force W1 is the same as the direction in which the cam barrel 28 is rotated by the fixing pin 35 when the lens unit 201 is driven in a direction against the gravitational force. In other words, the cam barrel 28 uses the force G1 caused by the gravitational force by converting the force G1 into driving force for rotating the cam barrel 28. The direction of the force is referred to as a forward rotation direction (of the cam barrel 28).

When the cam barrel 28 receives the force W1 to rotate in the forward rotation direction, the force W1 is transmitted to the fixing pin 35 through the driven cam groove 28b. However, because the fixing pin 35 is fixed to the frame 21, the cam barrel 28 receives reactive force from the fixing pin 35.

Herein, in the present exemplary embodiment, a direction in which the driven cam groove 28b extends is inclined toward the direction of the force W1. When an acute angle of the angles at which the driven cam groove 28b intersects with the plane P1 is denoted by $\gamma$, the angle $\gamma$ can be acquired in the counterclockwise direction relative to the plane P1. In other words, the driven cam groove 28b has positive inclination the same as that of the driving cam groove 28a. Due to this positive inclination, the driven cam groove 28b converts the force W1 into the force F1.

The force F1 has a direction opposite to the direction of the force G0 (G1) caused by the gravitational force. In other words, the force F1 assists the male helicoid screw member 7 to move the lens unit 201 from the initial position to the intermediate position.

As described above, in the present exemplary embodiment, the balancer portion 203 includes the sub-lens 30, and the sub-lens holding portion 202 functions as a balancer portion whereas the balancer portion 203 functions as a sub-lens holding portion.

<Condition for Reducing Load>

In the present exemplary embodiment, in order to reduce the load applied to the male helicoid screw member 7 when the lens apparatus is inclined to cause the lens unit 201 to move against the gravitational force, a force has to be generated in a direction opposite to the direction of the force G0 caused by the gravitational force.

A force with which the sub-lens holding portion 202 causes the cam barrel 28 to rotate is defined as W1, and a rising angle of the driven cam groove 28b is defined as $\gamma$ where counterclockwise rotation direction or orientation is taken as a positive direction or orientation. At this time, as illustrated in the coordinate D in FIG. 14, a sign is defined in such a manner that the forward rotation direction of the cam barrel 28 is the positive rotation and the backward rotation direction thereof is the negative rotation. Further, the sign is defined in such a manner that an orientation on a subject S-side in the optical axis O direction is the positive orientation and an orientation on an image sensor C-side opposite to the positive orientation is the negative orientation. The assisting driving force F1 that the sub-lens holding portion 202 receives from the lens barrel 18 can be expressed by the following formula 3.

$$F1 = W1 \tan \gamma \qquad (3)$$

Further, the force with which the balancer portion 203 causes the cam barrel 33 to rotate is defined as W2, and a rising angle of the driven cam groove 33b is defined as $\eta$ when counterclockwise rotation is taken as the positive orientation. Definition of the sign is the same as that of the formula 3. At this time, the assisting driving force F2 that the balancer portion 203 receives from the lens barrel 18 can be expressed by the following formula 4.

$$F2 = W2 \tan \eta \qquad (4)$$

Accordingly, when the lens unit 201 is driven in a state where the lens barrel 18 is inclined at the angle $\gamma$ relative to the gravitational force, resultant force F of the assisting driving force is expressed by the following formula 5.

$$F = F1 + F2 = W1 \tan \gamma + W2 \tan \eta \qquad (5)$$

When the load caused by the gravitational force that is applied to the male helicoid screw member 7 in the optical axis direction is L, the resultant force F of the assisting driving force expressed by the formula 5 is defined to constantly act in the orientation opposite to the orientation of the load L. This can be expressed by the following formula 6.

$$|L| > |L + F| \qquad (6)$$

Accordingly, each component has to be set to satisfy the formula 6 in order to implement the present exemplary embodiment.

<Effect>

In the present exemplary embodiment, the assisting can is formed into a shape having the orientation of inclination equal to the orientation of inclination of the driven cam (a positive/negative sign of an angle $\gamma$, $\eta$, $\zeta 1$, or $\zeta 2$ defined in the coordinate D in FIG. 14) in the entire region used for driving the sub-lens holding portion. Accordingly, when the lens unit is driven from the C-side to the S-side, an effect of suppressing a load by the sub-lens holding portion can be acquired in the entire range thereof.

As described above, according to the lens apparatus of the present disclosure, a number of components does not have to be increased because the lens is held by the balancer portion, and a driving load of the lens group can be suppressed even in a case where the attitude of the lens apparatus is changed.

Although the preferred exemplary embodiments of the present disclosure have been described as the above, the present disclosure is not limited to the above-described exemplary embodiments, and various modifications and variations are possible within the scope of the present disclosure.

In the second exemplary embodiment, even if the balancer portion 203 is not provided, an effect of causing the sub-lens holding portion 202 to reduce the load caused by the gravitational force applied to the male helicoid screw member 7 can be acquired in the entire driving range of the lens unit 201. This is because the driving cam groove 28a that also serves as the assisting cam has a shape inclining and extending toward the direction of the force G1 in the entire region used for rotation of the cam barrel 28. In addition, the driving cam groove 28a does not have to be inclined in a region not used for the rotation of the cam barrel 28.

With the above-described configuration, the sub-lens holding portion 202 functions as the balancer portion so that an effect of reducing the load can also be acquired in the lens group consisting of only the sub-lens 25 and the main lens 17.

Similarly, in the second exemplary embodiment, even if the sub-lens holding portion 202 is not provided, an effect of causing the balancer portion 203 to reduce the load caused by the gravitational force applied to the male helicoid screw member 7 can be acquired in the entire driving range of the lens unit 201.

In the first and the second exemplary embodiments, a lens apparatus including a focus lens group divided into two types of lenses, i.e., the main lens and the sub-lens, and configured to change a distance between the lenses (i.e., a lens apparatus having a floating mechanism) has been described. However, in a lens apparatus different from the above-described lens apparatus, the balancer portion according to the present exemplary embodiments can also achieve the effect of suppressing the increase of a load (an amount of increase or fluctuation of a load) in a case where the lens apparatus is used in a non-horizontal attitude. For example, in a lens apparatus configured to uniformly move a focus lens group, providing a balancer portion can achieve an effect of suppressing the increase of the load applied to the lens apparatus used in the non-horizontal attitude compared to a load applied to a lens apparatus used in a horizontal attitude.

In the first and the second exemplary embodiments, a lens apparatus having a driving portion, in particular, a lens apparatus including a focus lens unit having a focus lens group has been described. However, the present exemplary embodiment is also applicable to, for example, an imaging device that guides light from a subject to a camera E having an image sensor to form an image on the image sensor (see FIG. 15). In a case where the present exemplary embodiment is applied to the above-described imaging device, it is preferable that a lens apparatus including the lens unit described in the present exemplary embodiments be used as a lens apparatus M that forms an image of the subject on the image sensor.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-167277, filed Aug. 31, 2017, which is hereby incorporated by reference herein in its entirety.

What is claimed is:

1. A lens apparatus comprising:
   a lens unit including a first holder which holds a first lens and a second holder which holds a second lens;
   a fixing frame which holds the lens unit with the lens unit being movable in a direction of an optical axis of the lens unit; and
   a first power transmission device configured to transmit power to the lens unit to move the lens unit in the direction of the optical axis,
   wherein
   the lens unit includes a balancer and a second power transmission device,
   the second power transmission device includes a cam member, rotatable about the optical axis, in which a driving cam for moving the second holder, a driven cam, and an assisting cam are formed, and is configured to move the second holder in the direction of the optical axis with the power transmitted from the first power transmission device to change a distance between the first lens and the second lens,
   the fixing frame includes a fixing pin engaged with the driven cam,
   the driven cam is pushed by the fixing pin by movement of the lens unit to cause the cam member to rotate,
   the balancer is engaged with the assisting cam,
   the assisting cam is configured to assist the rotation of the cam member, and
   the assisting cam is configured such that a direction in which the cam member is rotated by a force applied by the second holder pushing the driving cam and a force applied by the balancer pushing the assisting cam becomes same as a direction in which the cam member is rotated by the fixing pin pushing the driven cam.

2. The lens apparatus according to claim 1, wherein the driven cam and the assisting cam extend with the driven cam and the assisting cam performing intersecting with a plane orthogonal to the optical axis, and
   wherein in a case where an orientation of inclination of each of the driven cam and the assisting cam is defined according to which of a counterclockwise direction or a clockwise direction from the plane obtains an angle of the intersecting that is an acute angle outside the cam member, the assisting cam and the driven cam have respective regions of which the orientation of the driven cam and the orientation of the assisting cam are equal to each other.

3. The lens apparatus according to claim 2, wherein one of the respective regions corresponding to the assisting cam include an entire region, of the assisting cam, where the balancer moves.

4. The lens apparatus according to claim 1, wherein the second holder and the balancer are, in a direction orthogonal to the optical axis, inside the first holder.

5. The lens apparatus according to claim 1, wherein the first lense and the second lense are held in the lens unit on an object side with respect to the balancer.

6. The lens apparatus according to claim 1, wherein the lens unit is configured to reduce a load applied to the first power transmission device in an entire range in which the lens unit moves against the gravitational force.

7. The lens apparatus according to claim 1, wherein the balancer holds a third lens.

8. The lens apparatus according to claim 1, wherein the balancer has a function of reducing generation of stray light caused thereby.

9. The lens apparatus according to claim 1, wherein the balancer is engaged with the second power transmission device at three portions thereof.

10. An image pickup apparatus comprising:
    an image pickup element; and
    a lens apparatus configured to form an image on the image pickup element,
    wherein the lens apparatus includes:
    a lens unit including a first holder which holds a first lens and a second holder which holds a second lens;

a fixing frame which holds the lens unit with the lens unit being movable in a direction of an optical axis of the lens unit; and a first power transmission device configured to transmit power to the lens unit to move the lens unit in the direction of the optical axis, wherein the lens unit includes a balancer and a second power transmission device, the second power transmission device includes a cam member, rotatable about the optical axis, in which a driving cam for moving the second holder, a driven cam, and an assisting cam are formed, and is configured to move the second holder in the direction of the optical axis with the power transmitted from the first power transmission device to change a distance between the first lens and the second lens, the fixing frame includes a fixing pin engaged with the driven cam, the driven cam is pushed by the fixing pin by movement of the lens unit to cause the cam member to rotate, the balancer is engaged with the assisting cam, the assisting cam is configured to assist the rotation of the cam member, and the assisting cam is configured such that a direction in which the cam member is rotated by a force applied by the second holder pushing the driving cam and a force applied by the balancer pushing the assisting cam becomes same as a direction in which the cam member is rotated by the fixing pin pushing the driven cam.

* * * * *